United States Patent Office 3,035,095
Patented May 15, 1962

---

3,035,095
ORGANO-PHOSPHORUS-BORON COMPOUND AND METHOD OF MAKING SAME
William David English, Garden Grove, Calif., assignor to United States Borax & Chemical Corporation, Los Angeles, Calif., a corporation of Nevada
No Drawing. Filed Aug. 10, 1959, Ser. No. 832,429
2 Claims. (Cl. 260—606.5)

This invention is a continuation-in-part of my previously filed application bearing Serial Number 746,321 dated July 3, 1958 and now abandoned.

This invention relates as indicated to an organic compound and phosphorus and boron and has more particular reference to a phenylphosphino-phenylborane.

It is an object of this invention to provide a new material containing boron, phosphorus in the chain and carbon attached as a substituent, the boron being bonded to phosphorus.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises a poly-(phenylphosphino-phenylborane) having the general formula

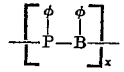

wherein $\phi$ is the phenyl radical $C_6H_5$, X is an integer of 3-4, and wherein boron is bonded only to phosphorus.

The invention is illustrated by the following example:

I

A solution consisting of 2 grams of phenylphosphine in 100 ml. of 30–60° petroleum ether was put into a flask with stirring. To this was added a solution of 2.9 grams of phenylboron dichloride in 10 ml. of 30–60° petroleum ether and a solution of 3.7 grams of triethylamine in 20 ml. of 30–60° petroleum ether. A vigorous reaction took place with evolution of heat and precipitation of a solid. Stirring was continued for about 48 hours at room temperature. The precipitate was then washed with water to remove triethylammonium chloride and easily hydrolyzable substances. After washing, the solid was purified twice by dissolution in ethanol and precipitated by addition of water. The final polymer was a white powder, which melted at about 142–144° C., was soluble in alcohol and insoluble in water. A cryoscopic molecular weight determination of the product showed it to have a molecular weight of about 630, indicating the composition to be a mixture of trimer and tetramer.

The proportions of the reactants to produce the present poly(phenylphosphino-phenylborane) compositions are not critical. In the preferred embodiment of my invention I use equimolecular proportions; however, excess of either reactant can be used if desired.

The compositions of this invention can be homopolymerized or copolymerized to produce films, shaped objects, etc. I have also found that the present compositions when added to polymers such as the polyvinyls have utility as antioxidants and will act as radiation stabilizers. The phenylphosphino-phenylboranes will also be found to have utility as an additive in gasoline as an antiknock agent and to prevent preignition.

Other modes of applying the principle of the invention may be employed, change being made as regards the details described, provided the features stated in any of the following claims or the equivalent of such be employed.

I, therefore, particularly point out and distinctly claim as my invention:

1. The method of producing a composition of matter consisting essentially of an admixture of the trimer of phenylphosphinophenylborane and the tetramer of phenylphosphinophenylborane which comprises reacting equimolecular quantities of phenylphosphine and phenylboron dichloride in the presence of triethylamine in petroleum ether solvent and separating the resultant precipitated product by filtration.

2. A composition consisting essentially of an admixture of the trimer of phenylphosphinophenylborane and the tetramer of phenylphosphinophenylborane having the formulae

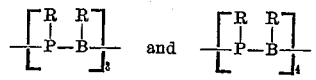

respectively, where R is phenyl.

References Cited in the file of this patent
UNITED STATES PATENTS

| | | |
|---|---|---|
| 2,877,272 | Burg et al. | Mar. 10, 1959 |
| 2,892,873 | Haber et al. | June 30, 1959 |
| 2,925,440 | Burg et al. | Feb. 16, 1960 |